Patented Aug. 5, 1941

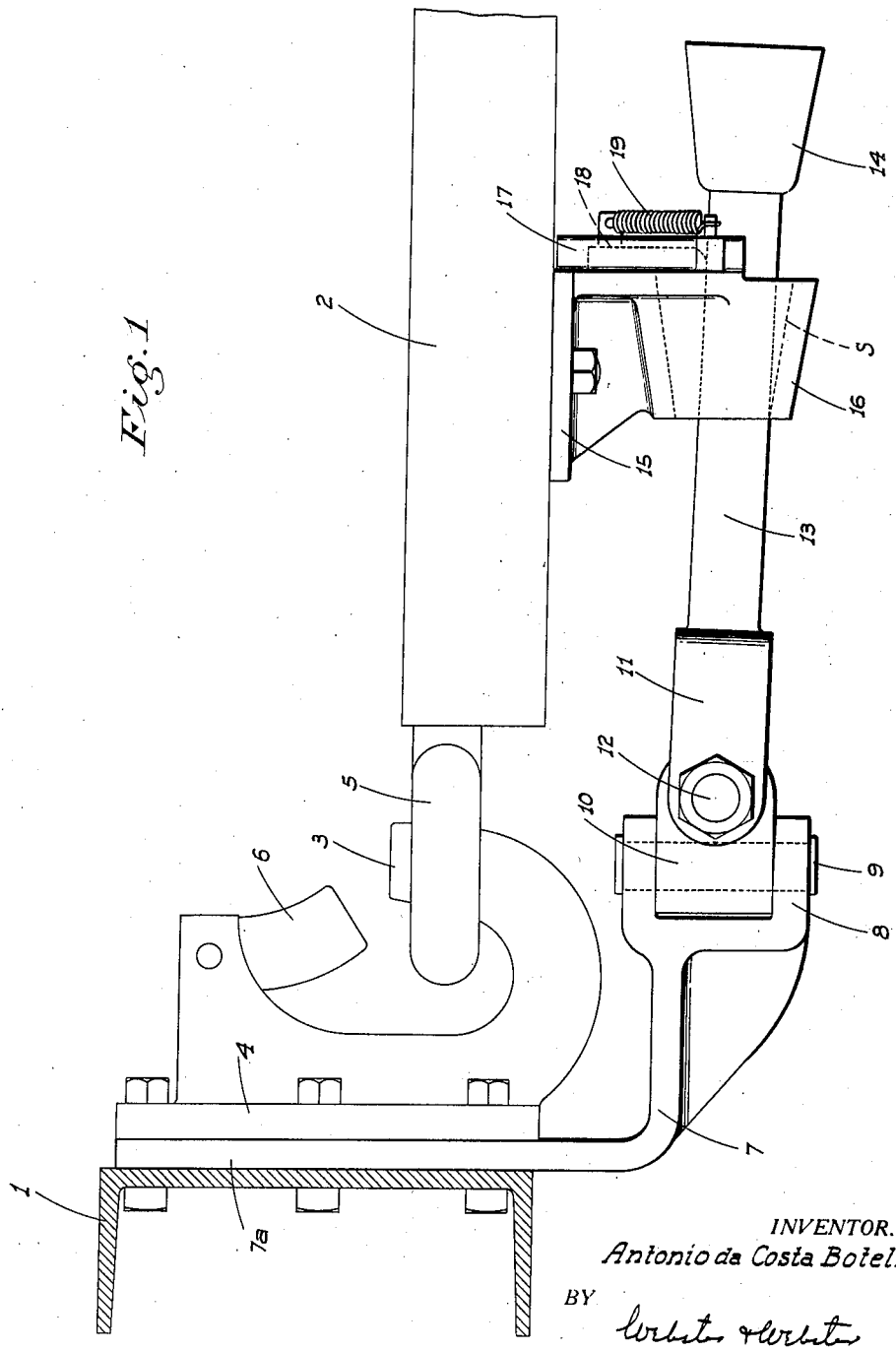

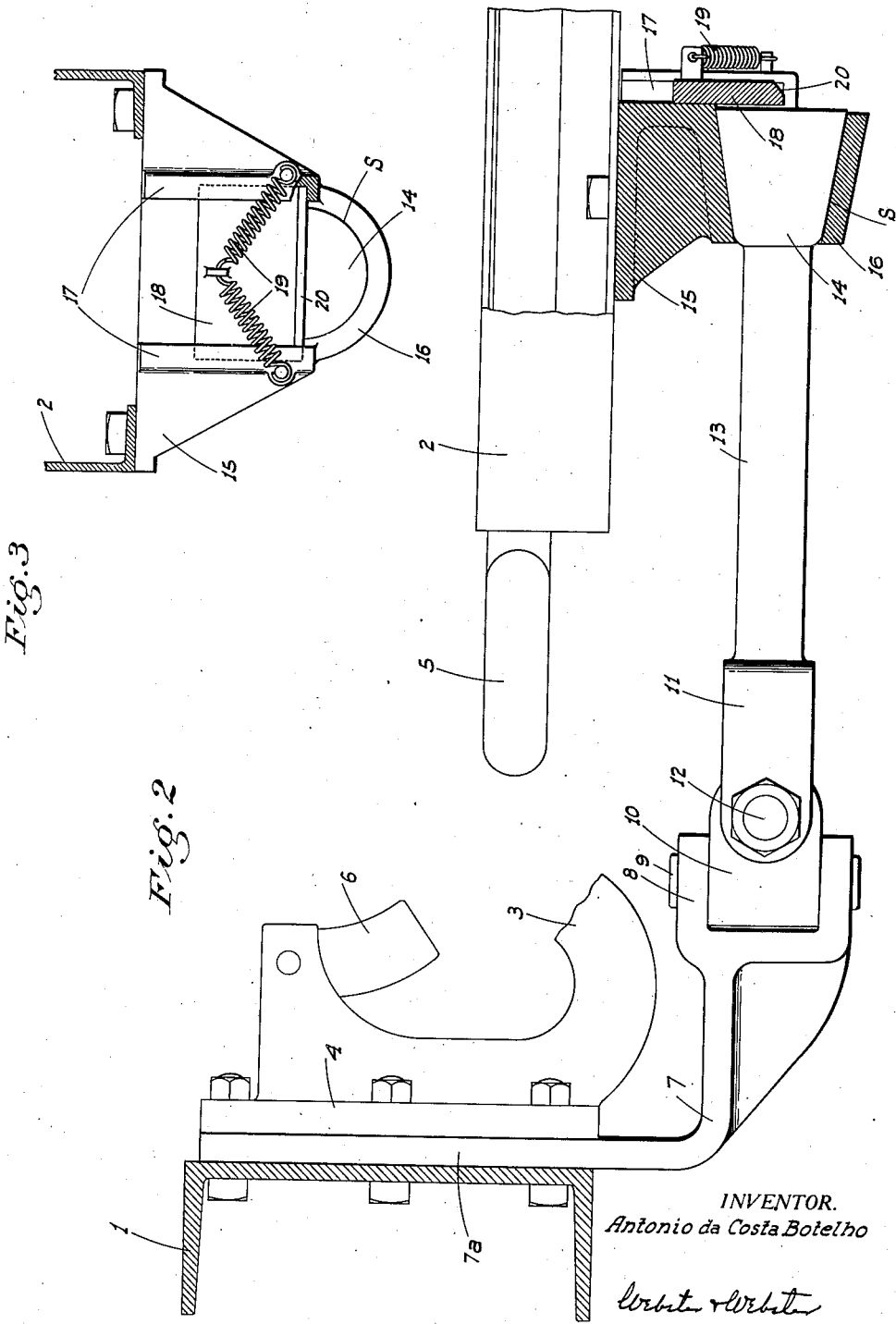

2,251,656

UNITED STATES PATENT OFFICE 2,251,656

SAFETY ATTACHMENT FOR TRAILER COUPLINGS

Antonio da Costa Botelho, Fresno, Calif.

Application December 24, 1940, Serial No. 371,523

6 Claims. (Cl. 280—33.44)

This invention relates in general to an improvement in the coupling assembly between a truck and trailer, and in particular the invention relates to a safety attachment for use in connection with a conventional trailer coupling or hitch.

At the present time it is customary to employ with the usual trailer hitch, safety chains which extend between the truck and trailer on opposite sides of the hitch; such chains normally being slack to permit of relative turning movement between the truck and trailer. In the event that the hitch breaks, these chains prevent the escape and complete detachment of the trailer from the truck, but they do not hold the trailer under guided control, and in such event the trailer tends to whip from side to side, often with serious consequences.

It is therefore the principal object of this invention to provide a safety attachment for connection between a truck and trailer and in association with the conventional hitch; such safety attachment being used in place of the ordinary safety chains and arranged so that if the hitch breaks, the safety attachment functions to maintain the trailer in connection with the truck and under guided control, in much the same manner as did the hitch before breaking.

A further object of the invention is to produce a simple and inexpensive device and yet one which will be exceedingly effective for the purpose for which it is designed.

These objects I accomplish by means of such structure and relative arrangement of parts as will fully appear by a perusal of the following specifications and claims.

In the drawings similar characters of reference indicate corresponding parts in the several views:

Figure 1 is a side elevation of the safety attachment in normal position.

Figure 2 is a side elevation of the device, partly in section, as in use and showing its position after breakage of the hitch.

Figure 3 is a rear view of the socket-forming sleeve assembly, including the spring urged locking plate.

Referring now more particularly to the characters of reference on the drawings, the numeral 1 indicates the rear end of the frame of a truck, while numeral 2 indicates the tongue of a trailer; the tongue being connected to a truck frame by means of a hitch. Such hitch comprises a rearwardly projecting and upwardly facing hook 3 mounted in connection with the frame 1 by means of a backing plate 4. An eye 5, disposed with its axis vertical, projects forwardly and rigidly from tongue 2 and removably engages over hook 3; accidental escape of eye 5 from hook 3 being normally prevented by means of a safety or latching finger 6 pivoted above hook 3.

The above described structure is conventional and the hitch as described is merely one of numerous types which are in use, and no claim is made thereto.

The safety attachment to which this invention is directed comprises a bracket 7 which includes an upstanding attachment plate 7a secured between backing plate 4 and truck frame 1. At its lower end and below hook 3 bracket 7 is formed with a rearwardly opening clevis 8 which includes a vertically disposed clevis pin 9. A block 10 extends between the upper and lower legs of clevis 8 and pin 9 projects therethrough whereby block 10 may swing in a horizontal plane about said pin as an axis. The block 10 projects rearwardly some distance from clevis 8 and a separate forwardly opening clevis 11, disposed in a plane at right angles to clevis 8, straddles the projecting portion of block 10; there being a removable horizontal bolt 12 extending between the legs of clevis 11 and passing through block 10. The assembly of clevis 8, pin 9, block 10, clevis 11, and bolt 12 form a universal connection or joint.

A heavy duty draft rod is formed integral with clevis 11 and projects some distance rearwardly therefrom below and substantially parallel to tongue 2, the rear end of draft rod 13 being formed with a frusto-conical head 14 whose base is disposed rearmost. A bracket 15 is fixed on the under side of tongue 2 adjacent its forward end and such bracket includes a sleeve 16 which is formed to provide a tapered socket S through which draft rod 13 projects; said socket tapering in a direction to symmetrically and correspondingly receive head 14.

When the hitch between the truck frame 1 and trailer tongue 2 is connected, the sleeve 16 surrounds draft rod 13 intermediate clevis 11 and head 14, as is clearly shown in Fig. 1, and permits unrestricted relative movement of the hitch parts. However, in the event that the hitch breaks apart due to any reason, as for example the breaking of the hook 3, as shown in Fig. 2, the safety attachment described above functions as follows:

With separation of the hitch and draft rod 13 moves forwardly relative to sleeve 16 until head 14 seats in socket S, whereupon draft connection is again established between the truck and trailer, and due to the construction of the attachment the trailer remains under the control of the truck and yet the universal connection with which the draft rod is connected permits relative turning movement of the truck and trailer.

In order to prevent escape or retraction of the head 14 from socket S when the head is once seated therein, I provide the following arrangement:

The bracket 15 at its rear end is formed with vertical and opposed guide channels or grooves 17 which are disposed substantially tangentially of the tapered socket S. A locking plate 18 extends between and slidably disposed in grooves 17 and is urged in the direction of the axis of the socket 16 by means of tension springs 19. Such plate normally engages the draft rod 13 ahead of head 14 and forces such rod into engagement with the bottom of the socket at its forward end whereby to prevent undesired vibration or rattling of such rod. When the head 14 moves forwardly relative to socket S, it strikes the lower edge of such plate which is round or chamfered, as at 20, causing the plate to ride up the head as such head enters the socket. After the head is in the socket the springs 19 cause the plate 18 to snap downwardly over the rear end of head 14, effectively locking such head in the socket and preventing escape of the head therefrom.

While my improved safety attachment for trailer couplings is intended only for emergency use, it is obvious that when the attachment is in use the trailer is under substantially the same draft control as when the conventional and usual hitch is in use. To return the attachment to its normal and inoperative position it is only necessary to force plate 18 upwardly, permitting head 14 to retract from socket S, whereupon the lower edge of such plate again frictionally rides on draft rod 13 between head 14 and clevis 11.

The fact that the head 14 can turn in socket S enables the trailer to swivel in a vertical transverse plane relative to the truck, as road inequalities may require, and without binding or strain of any part.

From the foregoing description it will be readily seen that I have produced such a device as substantially fulfills the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A safety attachment for trailer couplings comprising spaced attaching members, a draft rod, means connecting said rod at one end on one of the members, a sleeve on the other member and through which sleeve the rod projects, the bore of said sleeve tapering toward said one member to form a taper socket, a tapered head on the other end of the rod normally disposed clear of the socket, said head being formed to seat in said socket upon predetermined separating movement of said members, and a latch mounted in connection with said other member and operative to prevent retraction of the head from the socket when the head is once seated therein.

2. A structure as in claim 1 in which said latch comprises a vertical plate normally engaging the rod in front of the head and means slidably mounting the plate in connection with the sleeve at the back end thereof in position to drop behind the head when the latter is fully advanced into the socket.

3. A structure as in claim 1, in which said latch comprises a vertical plate normally engaging the rod in front of the head and means slidably mounting the plate in connection with the sleeve at the back end thereof in position to drop behind the head when the latter is fully advanced into the socket, and a spring yieldably urging the plate downwardly.

4. A safety attachment for trailer couplings comprising spaced attaching members, a draft rod, means connecting said rod at one end on one of the members, a sleeve on the other member and through which sleeve the rod projects, the bore of said sleeve being formed as a socket opening toward the other end of the draft rod, and a head on said other end of the rod normally disposed clear of the socket, said head being formed to snugly seat in said socket upon predetermined separating movement of said members.

5. A safety attachment for trailer couplings comprising spaced attaching members, a draft rod, means connecting said rod at one end on one of the members, a sleeve on the other member and through which sleeve the rod projects, the bore of said sleeve being formed as a socket opening toward the other end of the draft rod, a head on said other end of the rod normally disposed clear of the socket, said head being formed to snugly seat in said socket upon predetermined separating movement of said members, and a latch mounted in connection with said other member and operative to prevent retraction of the head from the socket when the head is once seated therein.

6. A structure as in claim 5 in which the head when engaged in the socket is turnable therein whereby to allow of relatively swivel movement of the truck and trailer in a vertical transverse plane.

ANTONIO DA COSTA BOTELHO.